April 26, 1932.   I. DOROGI ET AL   1,855,183
TEMPLATE FOR THE MANUFACTURE OF FLAT ARTICLES FROM THIN SHEETS OF RUBBER
Filed Oct. 11, 1928
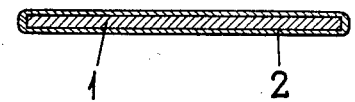
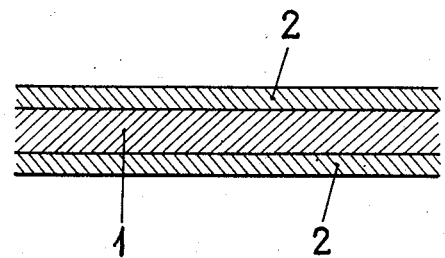

Patented Apr. 26, 1932

1,855,183

UNITED STATES PATENT OFFICE

ISTVÁN DOROGI AND LAJOS DOROGI, OF BUDAPEST, HUNGARY, ASSIGNORS OF ONE-HALF TO DR. DOROGI ES TARSA GUMMIGYAR R. T., OF BUDAPEST-ALBERTFALVA, HUNGARY, A LIMITED COMPANY OF HUNGARY

TEMPLATE FOR THE MANUFACTURE OF FLAT ARTICLES FROM THIN SHEETS OF RUBBER

Application filed October 11, 1928, Serial No. 311,945, and in Hungary August 17, 1928.

This invention relates to a process and template for the manufacture of flat articles from thin sheets of rubber.

It is known practice to manufacture flat rubber articles, as babies' drawers, bathing caps and the like from thin crude rubber sheets by placing on a crude sheet, a paper or metal template, in order to prevent the adherence of such portions which are not intended to be united, placing a second crude sheet on top, and then uniting contacting surfaces of the two sheets by means of pressure, removing the surplus parts, and vulcanizing the article by heat. The template may remain inside the article during vulcanization, but, especially in manufacturing cheap goods it is advisable to remove it before vulcanization, in order to save, on the one hand, templates, and space in the vulcanizing chamber. The removal of the template means a considerable loss of time, because the crude sheet surfaces adhere rather strongly to the template, and, also because simultaneously with the loosening and the subsequent removal of the template, the portions of the sheets which have been separated by the template must be carefully powdered in order to prevent them from adhering.

The present invention enables the template to be pulled out in a simple manner from its position between the surfaces which it has separated, and it enables the powdering of these surfaces to be automatically effected at the same time. The invention consists essentially of using, during the production of the seams connecting the sheets, a template coated with a solid and continuous layer of hard powder and removing the same before hot vulcanization.

The invention extends besides, to templates of such description and to the method of manufacturing them.

By the expression "hard powder" there is meant a conglomerate of the well-known powdering substances, which—like to the solid powders used in making cosmetics—possess a sufficient amount of inner cohesion to prevent them from crumbling to pieces, and which can readily give off particles of powder. A friable cake of such material is designated as a "compact" in the cosmetic industry.

In accordance with the invention, there is produced, for instance, a paste composed of talcum and alcohol, to which latter 5% of glycerine has been added, and this paste is applied to a metal template of the usual type, for example by dipping, spraying or similar operations, so as to form a layer of, e. g., 0.3 millimeters thickness. After the evaporation of the alcohol, the powdered substance will remain on the template in the form of hard powder. Instead of using a mixture of alcohol and glycerine, a mixture of alcohol and calcium chloride, or a very diluted solution of dextrine and the like may also be used.

Fig. 1 is a cross-section of the improved template.

Fig. 2 is an enlarged cross-sectional view.

The drawings show the template 1 covered with the powder layer 2.

A template of this description is placed, in a known manner, between two crude rubber sheets, when assembling rubber articles of the kind mentioned, and the sheets are pressed together, first by means of a slight pressure (e. g. by means of an air cushion). Subsequently, the known pressing of seams and cutting off of surplus parts of sheets is carried out. It is now possible to remove the template with the same ease, as if it had been wetted with water or glycerine, but the template leaves, on both sheet surfaces with which it has been in contact, an extremely fine layer of powder, which is wholly sufficient for preventing the mutual adhesion of the surfaces thus treated. In certain cases it may be useful to apply an extra powder in the ordinary way to the surfaces in question, if for example it is intended to vulcanize the articles superimposed one above the other.

The template removed from the first piece of work may be used 10 or 15 times in the same way.

If the hard and coherent layer of powder which has been formed on both flat surfaces of the template flakes off one or more spots of one surface of the template, this does not affect the use of the template unless the powder falls off a corresponding spot or spots on the opposite surface of the template. If the hard coherent layer of powder can no longer be used, it can be brushed off the surfaces of the template and a new layer can be formed on each surface of the template.

Since the layer of powder consists essentially of talcum, the powder does not affect either the rubber or the template, because it has no chemical action. Likewise the adhesion between the layer of powder and the surface of the template and the coherence of the grains of powder is less than the adhesion between said grains of powder and the rubber. Hence, when the template is withdrawn, the talcum powder clings to the rubber surfaces, and prevents them from adhering. It is therefore unnecessary to dust the rubber surfaces while the template is being removed.

Having now particularly described and ascertained the nature of our said invention and in what manner the same is to be performed, we declare that what we claim is:

1. A template adapted to prevent the adherence of crude rubber surfaces between which said template is located, said template comprising a rigid base portion having opposite flat surfaces, said flat surfaces having adhering layers consisting of a mixture of grains of powder and a non-volatile liquid.

2. A template adapted to prevent the adherence of crude rubber surfaces between which said template is located, said template comprising a rigid flat base portion covered by a rigid layer of a mixture of grains of a powdery material and of a binder.

In testimony whereof we affix our signatures.

ISTVÁN DOROGI.
LAJOS DOROGI.